US007430398B2

(12) United States Patent
Ban et al.

(10) Patent No.: US 7,430,398 B2
(45) Date of Patent: Sep. 30, 2008

(54) RADIO FREQUENCY IDENTIFICATION (RFID) SYSTEM FOR DYNAMICALLY AND AUTOMATICALLY ESTABLISHING COMMUNICATION BETWEEN A MOBILE WIRELESS COMMUNICATING DEVICE AND A DATA PROCESSING SYSTEM

(75) Inventors: Oliver K. Ban, Austin, TX (US); Anthony Cappa Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/121,127

(22) Filed: May 3, 2005

(65) Prior Publication Data
US 2006/0252374 A1   Nov. 9, 2006

(51) Int. Cl.
*H04B 7/00* (2006.01)
(52) U.S. Cl. .............. 455/41.2; 455/41.3; 455/556.1; 455/557; 235/385; 235/487; 235/375; 235/472.01; 235/492; 340/572.1; 340/10.1; 340/10.4; 340/568.1; 705/28; 705/64
(58) Field of Classification Search .............. 455/41.3; 235/472.01, 492, 385, 487, 375; 340/568.1, 340/572.1, 10.4, 10.1; 705/28, 64
See application file for complete search history.

(56) References Cited

U.S. PATENT DOCUMENTS

| | | | |
|---|---|---|---|
| 5,515,053 A * | 5/1996 | Hecht et al. ................. | 340/10.2 |
| 5,809,243 A | 9/1998 | Rostoker et al. ........ | 395/200.47 |
| 6,249,227 B1 | 6/2001 | Brady et al. ............. | 340/572.1 |
| 6,393,470 B1 | 5/2002 | Kanevsky et al. ........... | 709/219 |
| 6,434,403 B1 | 8/2002 | Ausems et al. .............. | 455/556 |
| 6,466,130 B2 * | 10/2002 | Van Horn et al. ........ | 340/572.1 |
| 6,496,113 B2 | 12/2002 | Lee et al. ................. | 340/572.7 |
| RE37,956 E * | 1/2003 | Blama ........................ | 235/435 |

(Continued)

OTHER PUBLICATIONS

IBM Technical Disclosure Bulletin, Method and Apparatus of Integrating a Personal Computer, Televisions, and Telephones into a Low-Cost Home Network, J.P. Kanidis et al., p. 23, vol. 40, No. 12, Dec. 1997.

(Continued)

*Primary Examiner*—Marceau Milord
(74) *Attorney, Agent, or Firm*—Julius B. Kraft; Gregory M. Doudnikoff

(57) ABSTRACT

RFID tags to provide a relatively low power and power conserving wireless communication system to dynamically and automatically transfer all preselected data developed in designated digital devices to a centralized data processing system. Inclusion, in the target mobile wireless devices from which data is to be transferred, of an RFID tag, preferably passive, to minimize power consumption that is conventionally recognizable by a short range RF transceiver in the computer system to which data is to be transferred. Thus, each mobile wireless device being tracked includes a short range RFID tag, a short range RF transceiver and storage means for the digital data developed by the device that is to be transferred. The data processing system to which the transfer is to be made should include a short range RF transceiver for identifying all RFID tags within this short range boundary; and means, responsive to the system RF transceiver identifying the RFID tag in the mobile wireless device within said short range boundary, for transmitting a signal to said mobile device to trigger the mobile device transceiver to transmit stored digital data to the data processing system.

7 Claims, 4 Drawing Sheets

U.S. PATENT DOCUMENTS

| | | | |
|---|---|---|---|
| 6,601,040 B1 | 7/2003 | Kolls | 705/14 |
| 6,705,520 B1 | 3/2004 | Pitroda et al. | 235/382.5 |
| 6,742,714 B2 * | 6/2004 | Cecil et al. | 235/492 |
| 6,745,047 B1 | 6/2004 | Karstens et al. | 455/556.1 |
| 6,745,259 B2 | 6/2004 | Wagner | 710/33 |
| 6,759,946 B2 | 7/2004 | Sahinoglu et al. | 340/310.01 |
| 7,049,963 B2 * | 5/2006 | Waterhouse et al. | 340/572.1 |
| 7,071,824 B2 * | 7/2006 | Trosper | 340/571 |
| 7,118,037 B2 * | 10/2006 | Holloway et al. | 235/385 |
| 7,123,148 B2 * | 10/2006 | Trosper | 340/571 |
| 7,145,454 B2 * | 12/2006 | Linjama et al. | 340/540 |
| 7,158,046 B2 * | 1/2007 | Cesar et al. | 340/825.69 |
| 7,161,487 B1 * | 1/2007 | Tracey et al. | 340/572.1 |
| 7,161,489 B2 * | 1/2007 | Sullivan et al. | 340/572.4 |
| 7,196,613 B2 * | 3/2007 | Horwitz et al. | 340/10.1 |
| 7,225,167 B2 * | 5/2007 | Hind et al. | 705/64 |
| 7,273,179 B2 * | 9/2007 | Anson et al. | 235/462.46 |
| 2004/0047310 A1 | 3/2004 | Chen et al. | 370/329 |

OTHER PUBLICATIONS

Proceedings of the IEEE, The Design and Implementation of HomeRF: A Radio Frequency Wireless Networking Standard for the Connected Home, Lansford et al., p. 1662, vol. 88, No. 10, Oct. 2000.

* cited by examiner

RADIO FREQUENCY IDENTIFICATION (RFID) SYSTEM FOR DYNAMICALLY AND AUTOMATICALLY ESTABLISHING COMMUNICATION BETWEEN A MOBILE WIRELESS COMMUNICATING DEVICE AND A DATA PROCESSING SYSTEM

TECHNICAL FIELD

The present invention relates to short range RF telecommunications and particularly to radio frequency identification (RFID) systems for tracking/communicating with mobile wireless data processing devices.

BACKGROUND OF RELATED ART

RFID of items through the use of RFID tags has been known for more than 50 years. It was first described in the Proceedings of the IRE, Oct. 1948, in an article, Communication by Means of Reflected Power, Harry Stockman, pp. 1196-1204. RFID tags may be active or passive. The passive tags are minute, in the order of 0.4 mm, and cost a few cents each. These passive RFID tags do not have their own power supply and have a signal range in the order of five (5) feet or less. On the other hand, active RFID tags usually have their own power source and currently may have ranges in the order of hundreds of feet and are more expensive. Also, the active RFID tags are commonly referred to as RFID transponders. Usage of RFID tags/transponders has been extensively documented for a wide variety of tracking functions. For example, low frequency RFID tags are commonly used for animal identification or anti-theft systems in automobiles. Higher frequency RFID tags are used for book tracking, pallet tracking or airline baggage tracking. There are, of course, well developed technologies in the higher frequency RFID tag tracking systems, such as UHF RFID and Microwave RFID tags.

Unlike active RFID tags that require a small power source of some kind, passive tags do not require power. They get their operating power from the energy generated by the tag reader or transceiver. Also, passive tags have an almost unlimited operating life.

The RFID product identification is an old and well developed technology. Some US patents that are representative of the art are: U.S. Pat. No. 4,918,416; U.S. Pat. No. 4,580,041; U.S. Pat. No. 4,236,068; U.S. Pat. Nos. 3,970,824; and 6,742, 714. With the rapidly expanding usage of RFID tag systems in both the business and consumer sectors, the prices of the systems and tags have been dropping. This, in turn, has resulted in the industry seeking new uses of this technology. The present invention provides such a new function directed to a particular consumer market, i.e. those responsible for the routine operation of a household.

The RFID application of the present invention is one involving needs in another related technology: the capture, organization and storage of data developed in mobile digital personal electronic devices. These devices generate, develop and/or store digital data. Among such digital devices are PDAs (personal digital assistants), digital cameras and mobile wireless telephones. Originally data transfer between such devices or the devices and a central data processor involved relatively complex wired communications specific to each type of device. In recent years, some wireless communication schemes have been tried for the transfer of data from such devices, but such schemes have placed a burden on the limited power supplies normally associated with the devices.

SUMMARY OF THE PRESENT INVENTION

The present invention provides a computer controlled system using RFID tags to provide a relatively low power and power conserving wireless communication system to dynamically and automatically transfer all preselected data developed in designated digital devices to a centralized data processing system. It also provides for the dynamic and automatic wireless transfer of data between designated wireless digital devices.

The invention is based upon the inclusion, in the target mobile wireless devices from which data is to be transferred, an RFID tag, preferably passive to minimize power consumption, that is conventionally recognizable by a short range RF transceiver in the computer system to which data is to be transferred. Thus, each mobile wireless device being tracked includes a short range RFID tag, a short range RF transceiver and storage means for the digital data developed by the device that is to be transferred. The data processing system to which the transfer is to be made should include a short range RF transceiver for identifying all RFID tags within this short range boundary; and means, responsive to the system RF transceiver identifying the RFID tag in the mobile wireless device within said short range boundary, for transmitting a signal to said mobile device to trigger the mobile device transceiver to transmit stored digital data to the data processing system.

In this manner, the mobile personal device being tracked remains in a minimal power need state until its transceiver is awakened by the trigger. At such time, for a relatively short time period, the device may be powered up from an available power source for the length of time that it takes to have the transceiver in the digital device transfer its stored data, and participate in the exchange. There are means in the data processing system for transmitting data to the triggered transceiver in wireless mobile device for control and other purposes. Then, the digital device may be returned to its low power state, including its passive RFID tag.

As will hereinafter be described in greater detail, in one application, the data processing system may be a home computer, the mobile digital device may be a personal electronics device and the stored digital data is data developed by the personal electronics device, e.g. the stored images in a digital camera.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
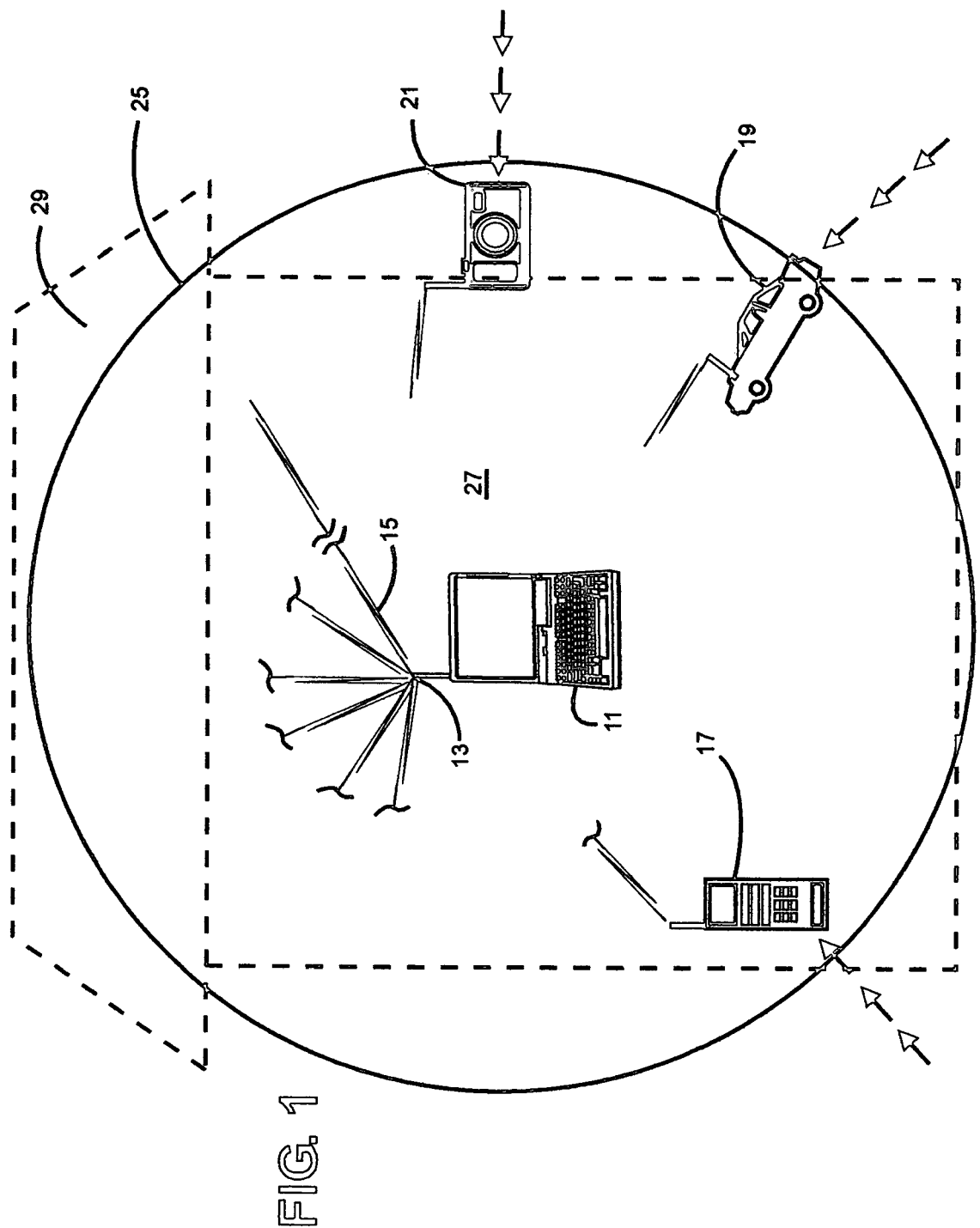
FIG. 1 is a generalized diagrammatic view of an RFID system according to the present invention based upon a central home computer with some illustrative household related or personal digital devices.

Referring to FIG. 1, there is provided a generalized view of a RFID system set up for a home computer data processing system in accordance with the present invention.

The household facility 27 is limited and defined by boundary 25, which in an illustrative normal household may be in the order of a 200 ft. radius from a centrally located RFID control center 11 that, as will be hereinafter described in greater detail, is a display data processing system controlling a transceiver sending and receiving signals 15 via antenna 13 from any of a set of RFID tags in the digital devices being monitored. Such typical digital devices may include a mobile wireless telephone 17, digital camera 21 or any of a variety of personal digital devices that may track and store data on a variety of automotive 19 conditions.

Because, as set forth above, RFID system technology is an old and well established technology, the technology implementation is well known, and it is beyond the scope of the present invention to detail known RFID technology. The present invention does not involve any technological innovations in RFID but rather an application of RFID tag technology for household possession tracking and control functions.

It is important for the person of the household, who may use a variety of the illustrated personal digital devices that develop and store data, to as effortlessly as possible have the data transferred into the central data processing system 11 where the data may be stored and correlated if necessary. Thus, whenever any of the mobile devices that have been in use are returned "home", i.e. within the range 25 of the short range RF transceiver in data processing system 11, the RF transceiver senses and recognizes the respective RFID tags in these devices. As will hereinafter be described in greater detail, the RF transceiver in data processor 11 sends a signal to the respective mobile device 17, 19 and 21 that activates the respective RF transceiver in the device to send the stored data in the device to central data processor 11. These transceiver to transceiver communications may also involve other control functions once the respective transceivers are activated.

The respective transceivers may operate using conventional IEEE 802.11 short range RF protocols. The IEEE 802.11 wireless transmission protocols are discussed in greater detail at pp. 60-62 in the text, *Peter Norton's Complete Guide to Networking*, SAMS Division of MacMillan Computer Publishing, Indianapolis, Ind., 1999, pp. 49-62, as well as in the article, *A Wireless Local Area Network Protocol That Improves Throughput Via Adaptive Control*, B. E. Mullins et al., *Proceedings of the IEEE International Conference on Communications*, pp. 1427-1431, Jun. 1997.

Figure 2:
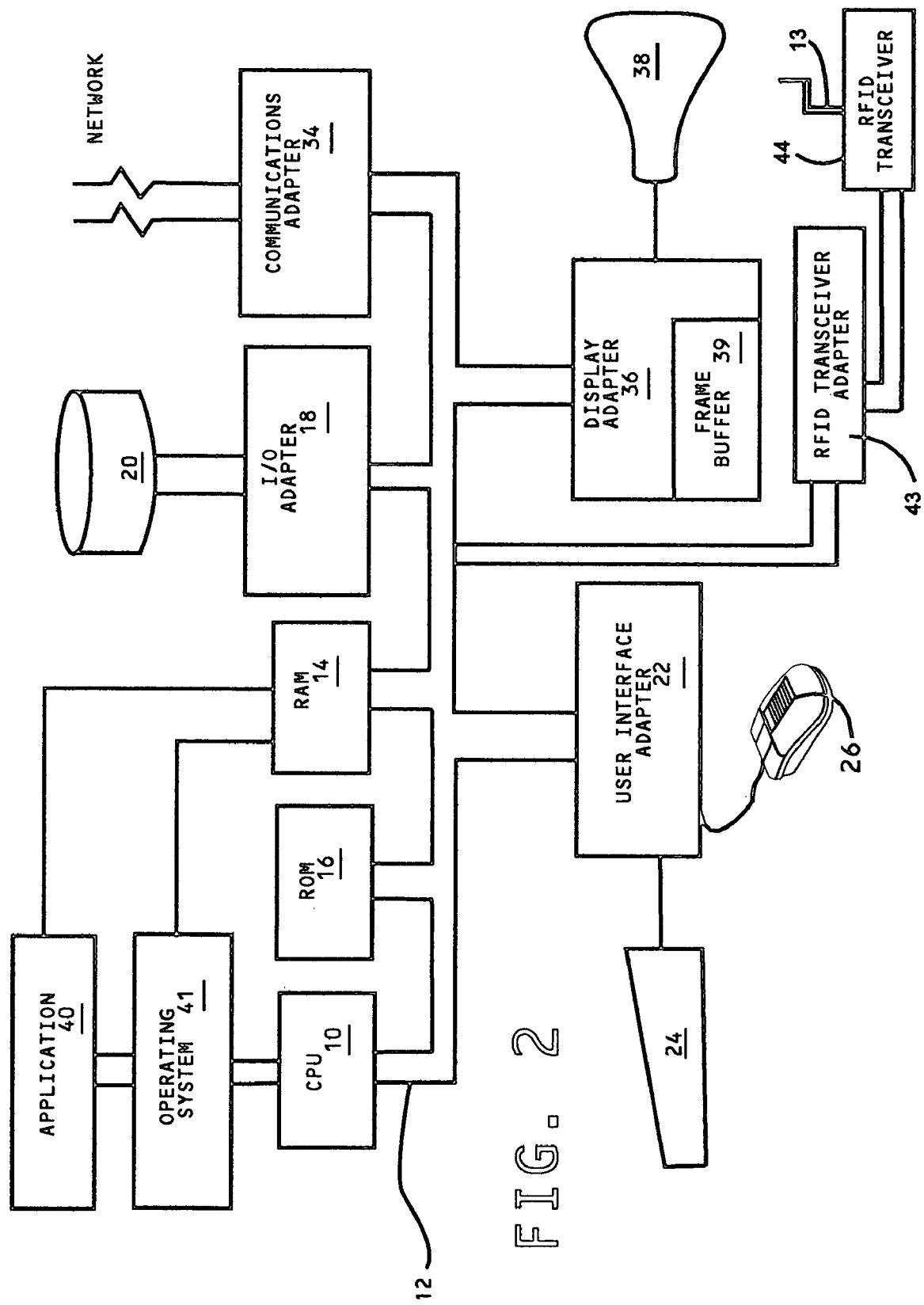
FIG. 2 is a block diagram of a data processing system including a central processing unit and network connections via a communications adapter that is capable of functioning as the basic data processing system of the present invention.

Referring now to FIG. 2, a typical generalized data processing system display terminal is shown that may function as the central data processing system 11 of this invention. A central processing unit (CPU) 10, such as any PC microprocessor in a PC available from International Business Machines Corporation (IBM) or Dell Corp., is provided and interconnected to various other components by system bus 12. An operating system 41 runs on CPU 10, provides control and is used to coordinate the functions of the various components of FIG. 1. Operating system 41 may be one of the commercially available operating systems, such as Microsoft's Windows XP™ as well as the UNIX or IBM AIX operating systems. An application program that includes routines of the present invention for controlling and tracking of RFID tagged mobile wireless personal digital devices, to be subsequently described in detail, runs in conjunction with operating system 41 and provides output calls to the operating system 41, which, in turn, implements the various functions to be performed by the application 40. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a Small Computer System Interface (SCSI) adapter that communicates with the disk storage device 20, i.e. a hard drive, a USB interface, an IEEE 1394 interface or another industry standard interface. Communications adapter 34 interconnects bus 12 with an outside network linkage 34 to communicate with other such systems over a network includes, of course, the Internet or Web. I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. There is a display associated with the controlling computer or server. In such a set up, display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the mouse or related devices, a user is capable of inputting information to the system through the keyboard 24 or mouse 26 and receiving output information from the system via display 38. The central RFID transceiver 44 communicates with RFID tags and device transceivers via antenna 13 and is connected into the system bus 12 via RFID transceiver adapter 43.

Figure 3:
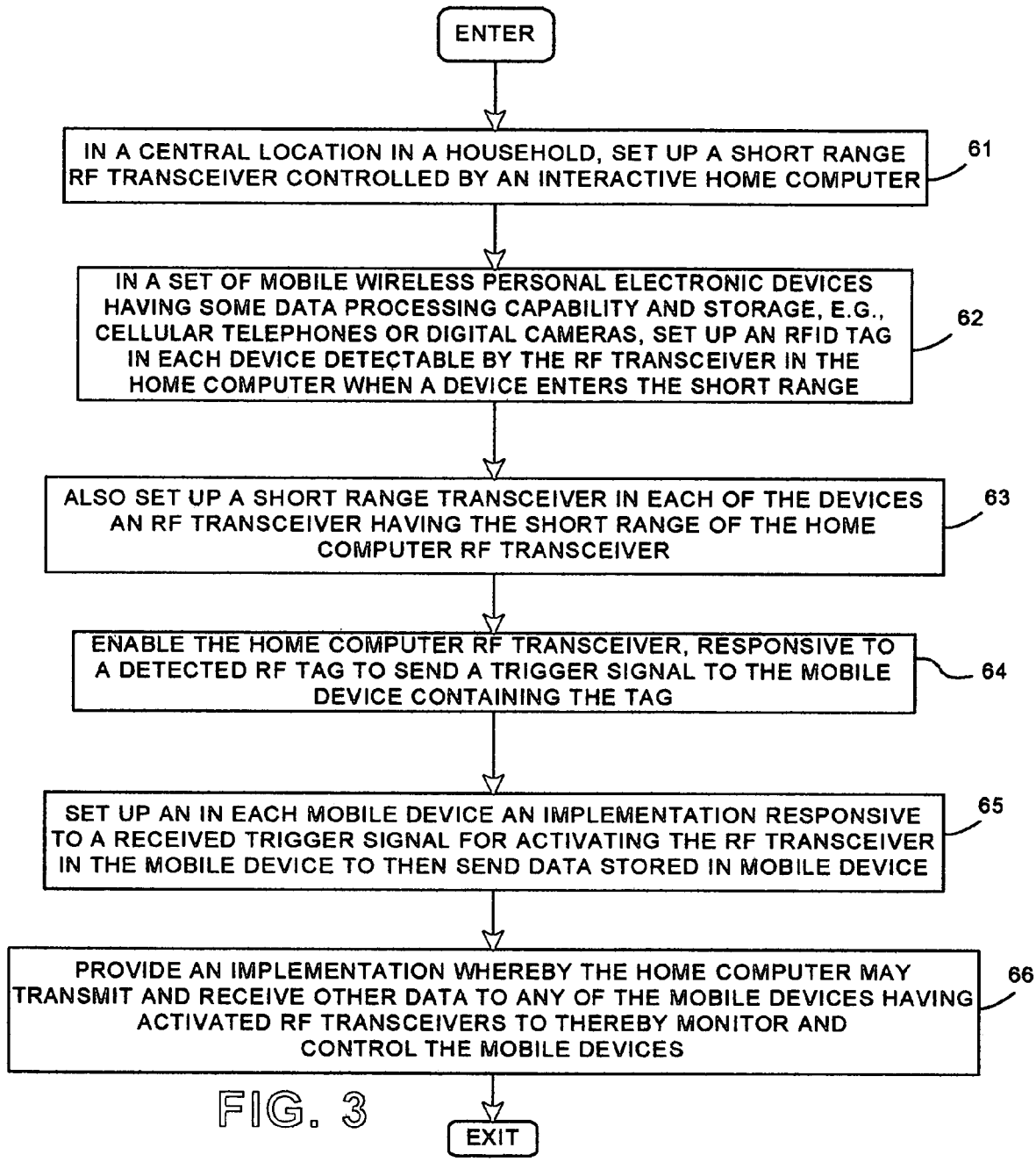
FIG. 3 is an illustrative flowchart describing the setting up of the elements of a program according to the present invention for tracking and controlling the selective transfer of data from mobile wireless personal digital devices through a RFID tag system.

Now, with reference to the programming shown in FIG. 3, there will be described how the system and programs of the present invention are set up. As an illustrative example, there will be described the setting up of a home computer system with the monitoring and dynamic and transparent transfer of data from mobile wireless personal digital devices. In a central location in a household, there is set up a short range RF transceiver controlled by an interactive home computer, step 61. In a set of selected wireless personal electronic devices having some data processing capability and storage, e.g. cellular telephones or digital cameras, there is set up in each, an RFID tag detectable by the RF transceiver in the home computer when a device enters the short range, step 62. There is also set up in each of the devices an RF transceiver having the same short range of the home computer RF transceiver, step 63. The home computer transceiver is enabled in response to a detected RF tag to send a trigger signal to the mobile device that contained the sensed RFID tag, step 64. There is set up in each mobile device an implementation responsive to a received trigger signal for activating the RF transceiver in the mobile device to then send the data stored in the mobile device to the central home computer, step 65. An implementation is provided whereby the home computer may transmit and receive other data to and from any of the mobile devices having activated RF transceivers to thereby monitor and control the mobile devices, step 66.

Figure 4:
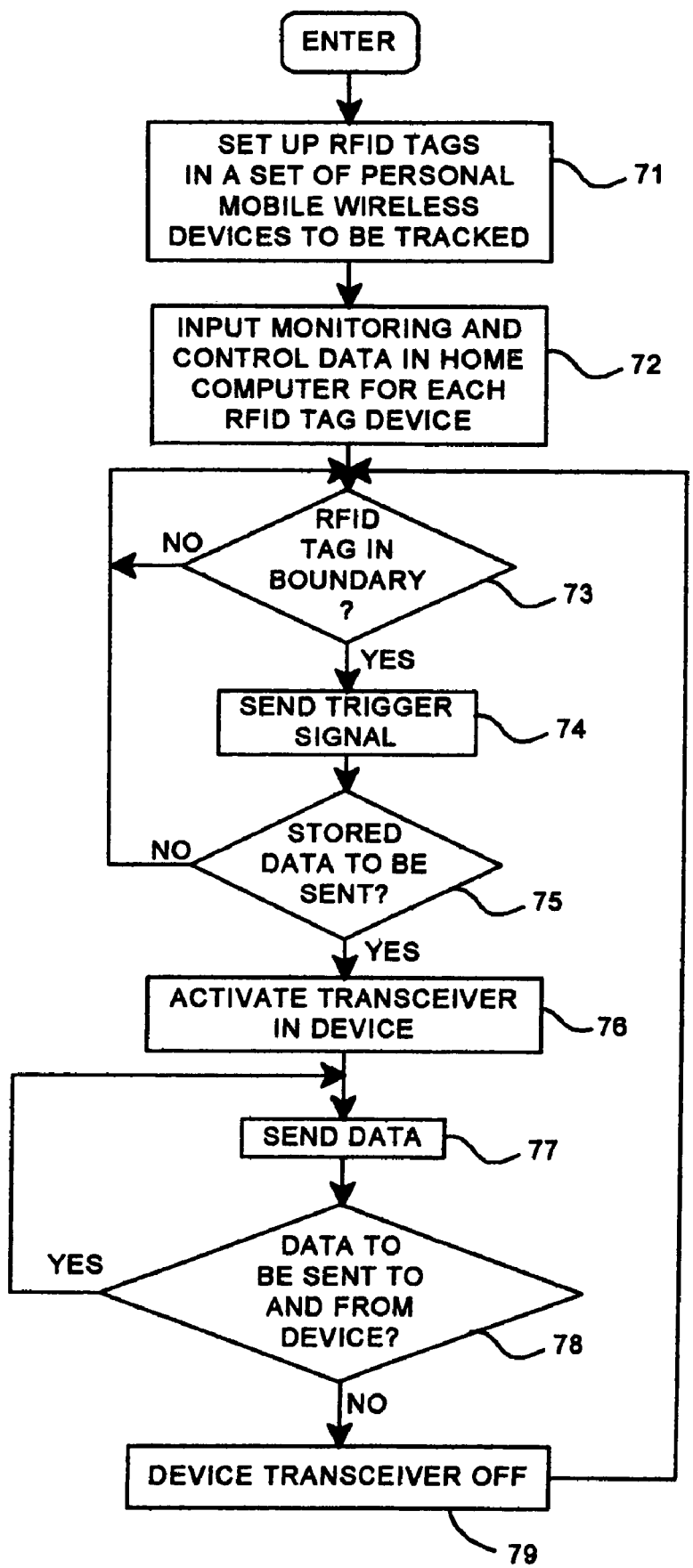
FIG. 4 is a flowchart of an illustrative run of the program set up in FIG. 3.

Now, with reference to the flowchart of FIG. 4, a simplified illustrative run of the process set up in FIG. 3 will be described. The simplification is made so as to illustrate an understandable process. Appropriate RFID tags are set up in a set of personal mobile wireless devices to be tracked, step 71. The monitoring and control data is input into the home computer for each RFID tag device, step 72. Then, the central data processing system (the home computer) monitors for RFID tags entering the short range transceiver of the system's boundary, step 73. If Yes, a trigger signal is sent to activate the RF transceiver in the entering mobile device having the RFID tag, step 74. Then a determination is made as to whether there is stored data to be sent in the personal digital device, step 75. If No, the process is branched back to step 73. If Yes, the transceiver in the triggered device is activated, step 76, and the data is automatically and transparently sent to the central home computer, step 77. Then, a decision is made as to whether there is any other data to be exchanged with the activated transceiver in the triggered personal digital device, step 78. If Yes, the process returns to step 77 and such data is sent. If No, then the process turns off the activated transceiver.

Although certain preferred embodiments have been shown and described, it will be understood that many changes and modifications may be made therein without departing from the scope and intent of the appended claims.

What is claimed is:

1. A computer controlled communication system for dynamically and automatically establishing communication between mobile wireless digital communicating devices and other data processors comprising:

moving a mobile wireless digital device including a short range RFID tag, a short range RF transceiver, and storage means for digital data into the reception boundary of a data processing system including a short range RF transceiver for identifying all RFID tags within said short range boundary whereby the transceiver is enabled to identify RFID tags;

responsive to said system RF transceiver identifying the RFID tag of said mobile wireless device within said short range boundary, transmitting a signal from said system transceiver to said mobile device; and responsive to said signal, triggering the mobile device transceiver to transmit stored digital data to said data processing system.

2. The communication system of claim 1 wherein said RFID tag is passive.

3. The communication system of claim 2 further including means in said data processing system for transmitting data to said triggered transceiver in wireless mobile device.

4. The communication system of claim 3 wherein said short range RF transceiver in said data processing system and said short range RF transceiver in said mobile wireless device coxununicate with one another using 802.11 b standard protocols.

5. The communications system of claim 4 wherein:

said data processing system is a hone computer;

said mobile digital device is a personal electronics device; and said stored digital data is data developed by the personal electronics device.

6. The communications system of claim 5 wherein said personal electronics device is a digital camera.

7. The communications system of claim 2 wherein said data processing system is also mobile.

\* \* \* \* \*